US011893915B2

(12) United States Patent
Zhao et al.

(10) Patent No.: US 11,893,915 B2
(45) Date of Patent: Feb. 6, 2024

(54) IMAGE STICKING TEST METHOD AND IMAGE STICKING TEST DEVICE

(71) Applicant: KUNSHAN GO-VISIONOX OPTO-ELECTRONICS CO., LTD, Jiangsu (CN)

(72) Inventors: Dongfang Zhao, Kunshan (CN); Zhe Du, Kunshan (CN); Shuang Guo, Kunshan (CN); Xun Liu, Kunshan (CN); Zidong Guo, Kunshan (CN)

(73) Assignee: KUNSHAN GO-VISIONOX OPTO-ELECTRONICS CO., LTD, Kunshan (CN)

( * ) Notice: Subject to any disclaimer, the term of this patent is extended or adjusted under 35 U.S.C. 154(b) by 0 days.

(21) Appl. No.: 17/692,052

(22) Filed: Mar. 10, 2022

(65) Prior Publication Data

US 2022/0198973 A1 Jun. 23, 2022

Related U.S. Application Data

(63) Continuation of application No. PCT/CN2021/078054, filed on Feb. 26, 2021.

(30) Foreign Application Priority Data

Mar. 24, 2020 (CN) ......................... 202010213705.7

(51) Int. Cl.
*G09G 3/00* (2006.01)
*G09G 3/20* (2006.01)

(52) U.S. Cl.
CPC ........... *G09G 3/006* (2013.01); *G09G 3/2007* (2013.01); *G09G 2320/0257* (2013.01); *G09G 2320/046* (2013.01); *G09G 2330/12* (2013.01)

(58) Field of Classification Search
None
See application file for complete search history.

(56) References Cited

U.S. PATENT DOCUMENTS

2010/0033205 A1* 2/2010 Zhao ..................... G02F 1/1309 324/760.01
2016/0055831 A1 2/2016 Kim
2021/0134214 A1* 5/2021 Ban .......................... G09G 3/32

FOREIGN PATENT DOCUMENTS

CN 101551986 A 10/2009
CN 103050074 A 4/2013
(Continued)

OTHER PUBLICATIONS

International Search Report dated May 14, 2021 in corresponding International Application No. PCT/CN2021/078054; 4 pages.
(Continued)

*Primary Examiner* — Andre L Matthews
(74) *Attorney, Agent, or Firm* — Maier & Maier, PLLC

(57) ABSTRACT

An image sticking test method and an image sticking test device. The image sticking test method includes: acquiring a first correspondence between a source-drain current of a preset drive transistor and time within a first preset time after a voltage of the preset drive transistor in an array substrate is switched from a first preset voltage to a second preset voltage; acquiring a second correspondence between a source-drain current of the preset drive transistor and time within a second preset time after the voltage of the preset drive transistor is switched from a third preset voltage to the second preset voltage; and acquiring a first image sticking test curve of the array substrate according to the first correspondence, the second correspondence and an image sticking evaluation formula, where the first image sticking test curve is a correspondence between time and an image sticking evaluation value.

18 Claims, 3 Drawing Sheets

(56) References Cited

FOREIGN PATENT DOCUMENTS

| | | | |
|---|---|---|---|
| CN | 104091555 | A | 10/2014 |
| CN | 105096789 | A | 1/2018 |
| CN | 108182899 | A | 6/2018 |
| CN | 108735135 | A | 11/2018 |
| CN | 109949730 | A | 6/2019 |
| CN | 111341232 | A | 6/2020 |
| JP | H09101816 | A | 4/1997 |

OTHER PUBLICATIONS

First Office Action dated Feb. 21, 2022 in corresponding Chinese Application No. 202010213705.7; 9 pages.

* cited by examiner

IMAGE STICKING TEST METHOD AND IMAGE STICKING TEST DEVICE

CROSS-REFERENCE TO RELATED APPLICATION(S)

The present application is a continuation of International Patent Application No. PCT/CN2021/078054, filed on Feb. 26, 2021, which is based on and claims priority to Chinese Patent Application No. 202010213705.7 filed with the China National Intellectual Property Administration (CNIPA) on Mar. 24, 2020, the disclosures of which are incorporated herein by reference in their entireties.

TECHNICAL FIELD

The present disclosure relates to display technologies, for example, an image sticking test method and an image sticking test device.

BACKGROUND

With the development of display technologies, a display panel plays a more and more important role. Accordingly, the requirements for the display panel are getting higher and higher.

The display panel needs to be subjected to an image sticking test before leaving the factory. However, there are some problems in the image sticking test of the display panel, such as long film flow period and high cost.

SUMMARY

The present disclosure provides an image sticking test method and an image sticking test device so as to shorten the film flow period and reduce the cost.

The image sticking test method is provided and includes: acquiring a first correspondence between a source-drain current of a preset drive transistor and time within a first preset time after a voltage of the preset drive transistor in an array substrate is switched from a first preset voltage to a second preset voltage; acquiring a second correspondence between a source-drain current of the preset drive transistor and time within a second preset time after the voltage of the preset drive transistor is switched from a third preset voltage to the second preset voltage; and acquiring a first image sticking test curve of the array substrate according to the first correspondence, the second correspondence and an image sticking evaluation formula, where the first image sticking test curve is a correspondence between time and an image sticking evaluation value.

The image sticking test device is further provided and includes a first acquisition module, a second acquisition module and a third acquisition module. The first acquisition module is configured to acquire a first correspondence between a source-drain current of a preset drive transistor and time within a first preset time after a voltage of the preset drive transistor in an array substrate is switched from a first preset voltage to a second preset voltage. The second acquisition module is configured to acquire a second correspondence between a source-drain current of the preset drive transistor and time within a second preset time after the voltage of the preset drive transistor is switched from a third preset voltage to the second preset voltage. The third acquisition module is configured to acquire a first image sticking test curve of the array substrate according to the first correspondence, the second correspondence and an image sticking evaluation formula, where the first image sticking test curve is a correspondence between time and an image sticking evaluation value.

The image sticking test method adopted in the technical solution of the embodiment includes: acquiring the first correspondence between a source-drain current of the preset drive transistor and time within the first preset time after the voltage of the preset drive transistor in the array substrate is switched from the first preset voltage to the second preset voltage; acquiring the second correspondence between a source-drain current of the preset drive transistor and time within the second preset time after the voltage of the preset drive transistor is switched from the third preset voltage to the second preset voltage; and acquiring the first image sticking test curve of the array substrate according to the first correspondence, the second correspondence and the image sticking evaluation formula. The first image sticking test curve corresponding to the array substrate can be directly acquired through a combination of the first correspondence, the second correspondence and the image sticking evaluation formula. The present disclosure does not need to acquire the first image sticking test curve of the corresponding display panel through an optical device after the light-emitting material is evaporated on the array substrate, thus reducing the film flow period, avoiding the waste of evaporation and module materials and reducing the cost.

DETAILED DESCRIPTION

The present disclosure is described below in conjunction with drawings and embodiments. The embodiments described herein are merely intended to explain and not to limit the present disclosure.

There are problems in the image sticking test, such as long film flow period and high cost. The reason for such problem is as follows: the image sticking test needs to be performed in a module stage, that is, after a light-emitting material is evaporated on the array substrate and encapsulated, the image sticking of the display panel needs to be evaluated through a test of the optical characteristics of a screen by an optical device, so there are problems such as long film flow period and waste of evaporation and module materials.

Figure 1:
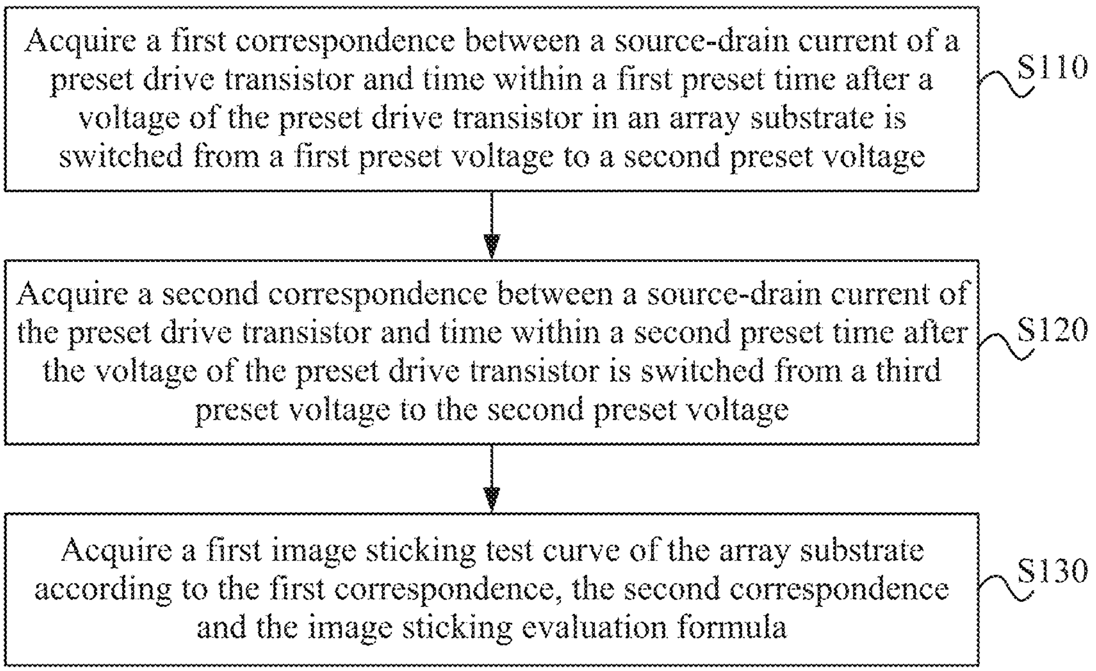
FIG. 1 is a flowchart of an image sticking test method according to an embodiment.

FIG. 1 is a flowchart of an image sticking test method according to an embodiment. Referring to FIG. 1, the image sticking test method includes the steps described below.

In step S110, a first correspondence between a source-drain current of a preset drive transistor and time is acquired within a first preset time after a voltage of the preset drive transistor in an array substrate is switched from a first preset voltage to a second preset voltage.

The array substrate may be an array substrate corresponding to an organic light-emitting diode (OLED) display panel or a liquid crystal display panel. The array substrate may include a plurality of drive transistors. For example, in an OLED display panel, the array substrate includes a plurality of pixel driving circuits; each pixel driving circuit includes a drive transistor; the drive transistor is configured to supply a drive current to a corresponding sub-pixel; when the voltage of the drive transistor is different, the generated source-drain current (the current between the source and the drain) is different, that is, the drive current of the sub-pixel is different, and the light emission of the sub-pixel corresponds to different grayscales, that is, the grayscale corresponding to the light emission of the display panel is related to the source-drain current of the drive transistor. The preset drive transistor may be any one of the drive transistors in the array substrate.

If the display panel needs to be subjected to the image sticking test when the grayscale switches from the first grayscale to the second grayscale and from the third grayscale to the second grayscale, the first preset voltage may be set as the voltage of the preset drive transistor when the array substrate is simulated to emit light under the condition of the first grayscale; the second preset voltage is set as the voltage of the preset drive transistor when the array substrate is simulated to emit light under the condition of the second grayscale; the third preset voltage is set as the voltage of the preset drive transistor when the array substrate is simulated to emit light under the condition of the third grayscale. The second grayscale is between the first grayscale and the third grayscale. The correspondence between current and time when the voltage of the array substrate is switched from the first preset voltage to the second preset voltage and the correspondence between current and time when the voltage of the array substrate is switched from the third preset voltage to the second preset voltage are tested and substituted into the image sticking evaluation formula to obtain the image sticking test curve of the display panel made of the array substrate. The first preset voltage, the second preset voltage and the third preset voltage each may include a gate voltage, a source voltage, and a drain voltage of the drive transistor. When the voltage of the preset drive transistor is switched from the first preset voltage to the second preset voltage, merely the gate voltage may be switched with the corresponding source voltage and drain voltage unchanged.

Figure 2:
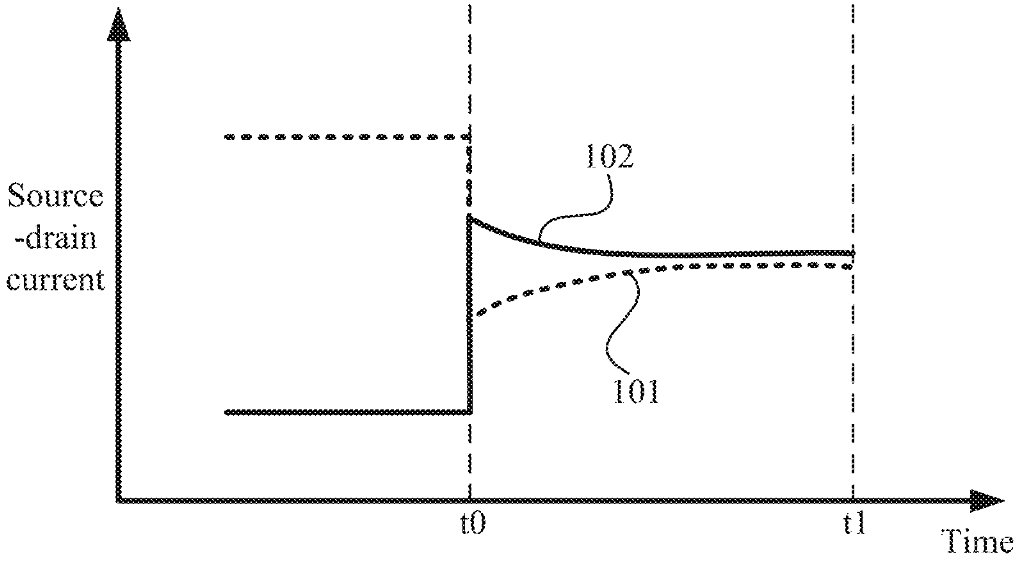
FIG. 2 is a graph of a correspondence between time and a source-drain current according to an embodiment.

FIG. 2 is a graph of a correspondence between time and a source-drain current according to an embodiment. Referring to FIG. 2, the first correspondence may be understood as the correspondence between time and a source-drain current within a first preset time when the voltage of the preset drive transistor is switched from the first preset voltage to the second preset voltage. The first grayscale may be grayscale 255, the second grayscale may be grayscale 48, and the third grayscale may be grayscale 0. In other embodiments, the second grayscale may also be grayscale 128, the first preset time may be determined according to the display panel corresponding to the array substrate, for example, may correspond to the time from the time after the grayscale of the display panel is switched to the time when the image sticking of the display panel disappears. As shown in FIG. 2, the first correspondence curve 101 indicates that the preset drive transistor first operates at the first preset voltage, that the voltage of the preset drive transistor is switched from the first preset voltage to the second preset voltage at moment t0, and that the preset drive transistor then operates at the second preset voltage all the time. A curve from moment t0 to a preset moment (for example, within a time period from t0 to t1) in the first correspondence curve 101 may correspond to the first correspondence.

In step S120, a second correspondence between a source-drain current of the preset drive transistor and time is acquired within a second preset time after the voltage of the preset drive transistor is switched from a third preset voltage to the second preset voltage.

As shown in FIG. 2, the second correspondence curve 102 indicates that the preset drive transistor first operates at the third preset voltage, that the voltage of the preset drive transistor is switched from the third preset voltage to the second preset voltage at moment t0, and that the preset drive transistor then operates at the second preset voltage all the time. A curve from moment t0 to a preset moment in the second correspondence curve 102 may correspond to the second correspondence.

In step S130, the first image sticking test curve of the array substrate is acquired according to the first correspondence, the second correspondence and the image sticking evaluation formula.

The first image sticking test curve corresponding to the array substrate can be directly acquired through a combination of the image sticking evaluation formula, the first correspondence acquired and the second correspondence acquired. The present disclosure does not need to acquire the first image sticking test curve of the corresponding display panel through an optical device after the light-emitting material is evaporated on the array substrate, thus reducing the film flow period, avoiding the waste of evaporation and module materials and reducing the cost.

The image sticking test method adopted in the technical solution of the embodiment includes: acquiring the first correspondence between a source-drain current of the preset drive transistor and time within the first preset time after the voltage of the preset drive transistor in the array substrate is switched from the first preset voltage to the second preset voltage; acquiring the second correspondence between a source-drain current of the preset drive transistor and time within the second preset time after the voltage of the preset drive transistor is switched from the third preset voltage to the second preset voltage; and acquiring the first image sticking test curve of the array substrate according to the first correspondence, the second correspondence and the image sticking evaluation formula. The first image sticking test curve corresponding to the array substrate can be directly acquired through a combination of the first correspondence, the second correspondence and the image sticking evaluation formula. The present disclosure does not need to acquire the first image sticking test curve of the corresponding display panel through an optical device after the light-emitting material is evaporated on the array substrate, thus reducing the film flow period, avoiding the waste of evaporation and module materials and reducing the cost.

In this embodiment, the second correspondence may also be first acquired and the first correspondence is then acquired, that is, step S120 may be first performed and step S110 is then performed, which is not limited in this embodiment.

Figure 3:
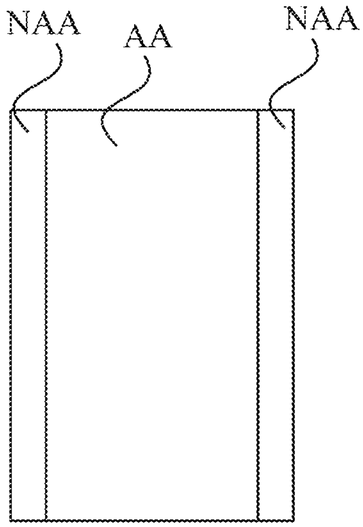
FIG. 3 is a structure diagram of an array substrate according to an embodiment.

FIG. 3 is a structure diagram of an array substrate according to an embodiment. Referring to FIG. 3, the preset drive transistor is a drive transistor in an electrical thin-film transistor test group (TEG) located in a non-active area (NAA).

The array substrate may include a display area AA and a non-active area (NAA). A test group (TEG) may be set in the non-active area (NAA). The test group includes multiple types of transistors, and the multiple types of transistors in the test group correspond to multiple types of transistors in the display area. For example, the test group includes a drive transistor corresponding to the drive transistor in the display area, and the parameters of the two types of drive transistors are the same, that is, the characteristics of the drive transistor in the test group are the same as the characteristics of the drive transistor in the display area. The first correspondence and the second correspondence of the drive transistor in the test group being obtained through test is equivalent to the first correspondence and the second correspondence of the drive transistor in the display area being obtained. Since the gate, drain and source of the drive transistor in the test group each have leads, the first preset voltage, the second preset voltage or the third preset voltage can be conveniently applied to the drive transistor, while the gate, source and drain of the drive transistor in the display area do not have external leads, so it is difficult to apply the first preset voltage, the second preset voltage or the third preset voltage. That is, a drive transistor in the electrical thin-film transistor test group (TEG) located in the non-active area (NAA) is set as the preset drive transistor so that the implementation difficulty of the image sticking test method can be greatly reduced.

The image sticking evaluation formula is as follows:

$$I(t)_{IND} = \left| \frac{I(t)_A - I(t)_B}{I(t)_A + I(t)_B} - \frac{I0_A - I0_B}{I0_A + I0_B} \right|.$$

$I(t)_{JND}$ denotes an image sticking evaluation value of the array substrate at moment t after the voltage of the preset drive transistor is switched; $I(t)_A$ denotes a source-drain current of the preset drive transistor at the moment t after the voltage of the preset drive transistor is switched from the first preset voltage to the second preset voltage; $I(t)_B$ denotes a source-drain current of the preset drive transistor at the moment t after the voltage of the preset drive transistor is switched from the third preset voltage to the second preset voltage; $I0_A$ is a source-drain current of the preset drive transistor at the first preset voltage; and $I0_B$ is a source-drain current of the preset drive transistor at the third preset voltage.

Figure 4:
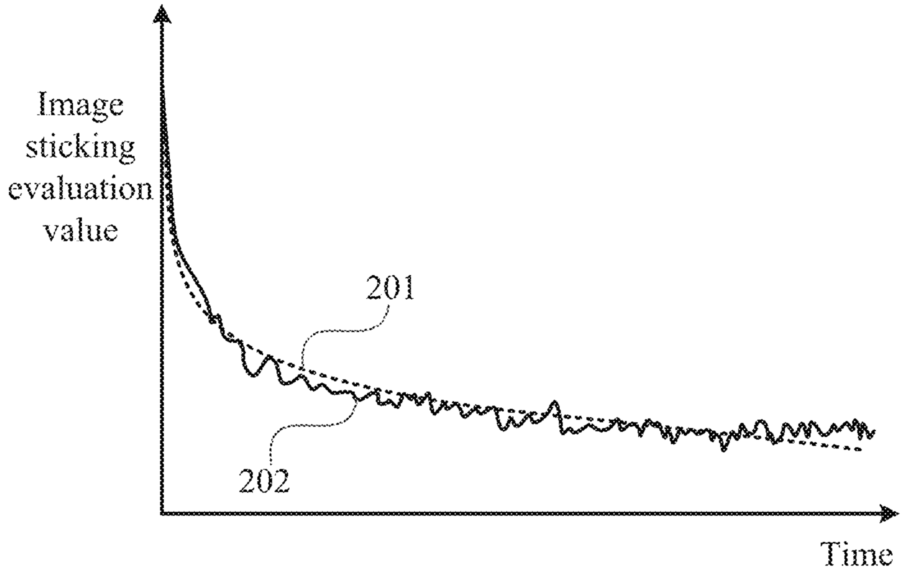
FIG. 4 is a result diagram of a first image sticking test curve according to an embodiment.

FIG. 4 is a result diagram of a first image sticking test curve according to an embodiment. Referring to FIG. 4, an actual curve 202 represents the image sticking evaluation value calculated according to the actually measured source-drain current of the preset drive transistor and the preceding image sticking evaluation formula; a fitting curve 201 represents a curve obtained through fitting of the actual curve 202. As can be seen from FIG. 4, the fitting curve is close to the actual image sticking curve of the display panel and has a more clear and more apparent expression form than the actual image sticking curve. According to the experimental verification, the first image sticking test curve obtained in this embodiment has a linear relationship with the first image sticking test curve obtained by the optical device testing the display panel. Therefore, the image sticking test curve reflecting the display panel made of the array substrate can be obtained simply through simulated image sticking test performed on the test group (TEG) in the non-active area (NAA) of the array substrate without evaporating light-emitting materials on the array substrate, thus shortening the test period and avoiding the waste of materials.

The image sticking test method further includes: acquiring a third correspondence between a source-drain current of a preset drive transistor and time within a third preset time after a voltage of the preset drive transistor in an array substrate is switched from a first preset voltage to a fourth preset voltage; acquiring a fourth correspondence between a source-drain current of the preset drive transistor and time within a fourth preset time after the voltage of the preset drive transistor is switched from a third preset voltage to the fourth preset voltage; acquiring a second image sticking test curve of the array substrate according to the third correspondence, the fourth correspondence and the image sticking evaluation formula, where the second image sticking test curve is a correspondence between time and an image sticking evaluation value; and acquiring a fitting image sticking test curve of the array substrate according to the first image sticking test curve and the second image sticking test curve.

The fourth preset voltage is the voltage of the preset drive transistor when the array substrate is simulated to emit light under the condition of the fourth grayscale. The fourth grayscale is between the first grayscale and the third grayscale, and the fourth grayscale is different from the second grayscale. For example, when the second grayscale is grayscale 48, the fourth grayscale may be grayscale 128. In this case, in the image sticking evaluation formula, $I(t)_A$ may denote a source-drain current of the preset drive transistor at the moment t after the voltage of the preset drive transistor is switched from the first preset voltage to the fourth preset voltage, and $I(t)_B$ may denote a source-drain current of the preset drive transistor at the moment t after the voltage of the preset drive transistor is switched from the third preset voltage to the fourth preset voltage. The first image sticking test curve and the second image sticking test curve have similar shapes, so after the first image sticking test curve and the second image sticking test curve are acquired, a third image sticking test curve of the array substrate can be fitted. For example, the corresponding image sticking evaluation value at any moment t on the third image sticking test curve is the average value of the corresponding image sticking evaluation value at the moment t on the first image sticking test curve and the corresponding image sticking evaluation value at the moment t on the second image sticking test curve. Using the third image sticking test curve as the image sticking test curve of the array substrate can reduce the error in the test process, that is, the accuracy of the third image sticking test curve is higher.

Before acquiring the first correspondence and the second correspondence, the method further includes performing a stability test (Id-Vg sweep) on the preset drive transistor and/or performing T-Aging (Temperature aging) process on the preset drive transistor.

The stability test (Id-Vg sweep) can be performed on the preset drive transistor first so as to determine stability of the preset drive transistor. If the stability is relatively good, the performance of the preset drive transistor is relatively good, and the first image sticking test curve obtained by the test is more accurate. If the change amount of $I(t)_{JND}$ as time changes is relatively small, the image sticking of the display panel corresponding to the array substrate is lighter. The T-Aging process may also be performed on the preset drive transistor so as to improve the stability of the drive transistor.

The first preset voltage, the second preset voltage, the third preset voltage and the fourth preset voltage are acquired through circuit simulation.

The voltages of the preset drive transistor when the grayscale of light emitted by the display panel made of the array substrate is the first grayscale, the second grayscale, the third grayscale and the fourth grayscale can be obtained through circuit simulation. That is, the first preset voltage, the second preset voltage, the third preset voltage and the fourth preset voltage can be acquired, thereby facilitating subsequent application of the first preset voltage, the second preset voltage, the third preset voltage and the fourth preset voltage separately to the preset drive transistor so as to obtain the first correspondence, the second correspondence, the third correspondence and the fourth correspondence.

Before acquiring the first correspondence, the second correspondence, the third correspondence and the fourth correspondence, the method further includes: adjusting the first preset voltage to make a source-drain current constant value of the preset drive transistor at the first preset voltage be a first current value; and adjusting the third preset voltage to make a source-drain current constant value of the preset drive transistor at the third preset voltage be a second current value.

The first current value may be the actual current value of the drive transistor corresponding to the array substrate when the display panel made of the array substrate emits light at the first grayscale. For example, when the first grayscale is grayscale 255, the first current is correspondingly 40 nanoamps, and when the third grayscale is grayscale 0, the second current is correspondingly 0 amps. The first current and the second current correspond to the source-drain currents corresponding to the array substrate when the display panel made of the array substrate is at respective actual grayscales. With such setting, the operating state of the preset drive transistor during test is closer to the actual operating state, and the obtained first image sticking test curve is closer to the actual image sticking curve of the display panel corresponding to the array substrate.

The first preset time and the second preset time may be greater than or equal to 60 seconds.

If the first preset time or the second preset time is too short, the current of the preset drive transistor does not operate at a constant value after the voltage of the preset drive transistor is switched so that the acquired first image sticking test curve is not complete enough and the image sticking performance of the display panel corresponding to the array substrate cannot be completely evaluated. The first preset time and the second preset time are set to be greater than or equal to 60 seconds so that a complete first image sticking test curve can be acquired, and then the image sticking performance of the display panel corresponding to the array substrate can be effectively evaluated.

Figure 5:
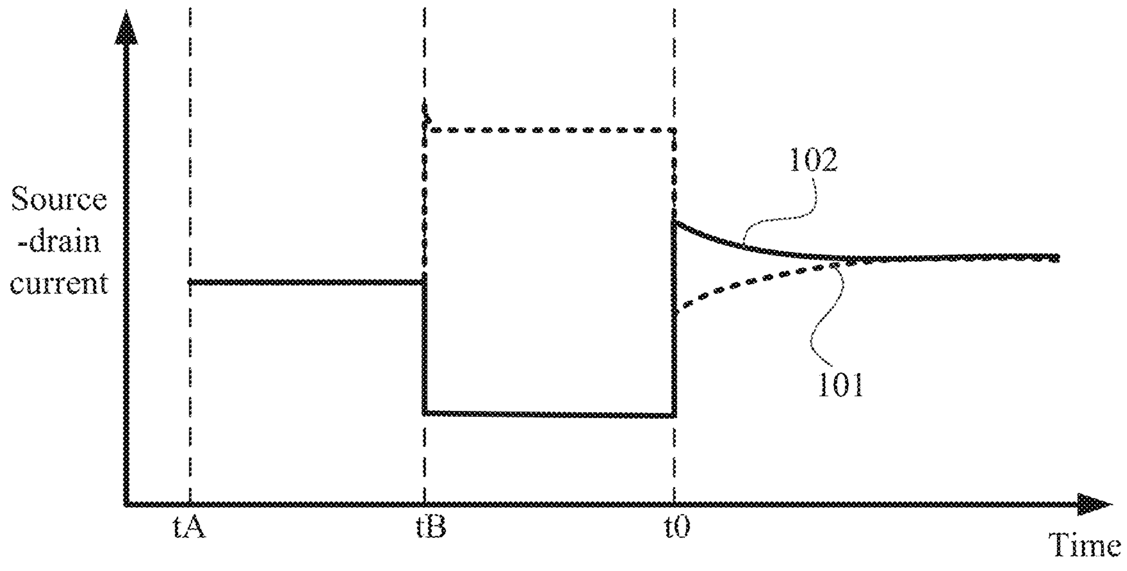
FIG. 5 is another graph of a correspondence between time and a source-drain current according to an embodiment.

Exemplarily, FIG. 5 is another graph of a correspondence between time and a source-drain current according to an embodiment. Referring to FIG. 5, after the fabrication of the array substrate is completed, the drive transistor in the test group of the array substrate can be subjected to the T-Aging process first so as to improve the stability of the drive transistor. Then, the second preset voltage is applied to the drive transistor, that is, Warm-up is performed, for example, the second preset voltage is applied for 50 seconds, and the values of the source-drain current of the drive transistor at multiple moments are tested (the tA-tB section of the first correspondence curve 101 in FIG. 5). Then, the voltage of the drive transistor is switched from the second preset voltage to the first preset voltage, the drive transistor keeps at the first preset voltage for a period of time (for example, 5 minutes (min) to 10 min), that is, a stress process, the values of the source-drain current of the drive transistor at multiple moments are tested, and the stable value of the source-drain current is $I0_A$ (the tB-t0 section of the first correspondence curve 101 in FIG. 5). Then, the voltage of the drive transistor is switched from the first preset voltage to the second preset voltage, the drive transistor keeps at the second preset voltage for a first preset time to obtain a complete correspondence between the source-drain current and the time. Within the first preset time, the correspondence between the time and the source-drain current is the first correspondence (the curve from moment t0 in the first correspondence curve 101 in FIG. 5).

When the second correspondence is acquired, the drive transistor in the test group of the array substrate can be subjected to the T-Aging process first so as to improve the stability of the drive transistor. Then, the second preset voltage is applied to the drive transistor, that is, Warm-up is performed, for example, the second preset voltage is applied for 50 seconds, and the values of the source-drain current of the drive transistor at multiple moments are tested (the tA-tB section of the second correspondence curve 102 in FIG. 5). Then, the voltage of the drive transistor is switched from the second preset voltage to the third preset voltage, the drive transistor keeps at the third preset voltage for a period of time (for example, 5 min to 10 min), that is, a stress process, the values of the source-drain current of the drive transistor at multiple moments are tested, and the stable value of the source-drain current is $I0_B$ (the tB-t0 section of the second correspondence curve 102 in FIG. 5). Then, the voltage of the drive transistor is switched from the third preset voltage to the second preset voltage, the drive transistor keeps at the second preset voltage for a second preset time to obtain a complete correspondence between the source-drain current and the time. Within the second preset time, the correspondence between the time and the source-drain current is the second correspondence (the curve from moment t0 in the second correspondence curve 102 in FIG. 5).

The first image sticking test curve of the array substrate is obtained according to the first correspondence and the second correspondence which are obtained through test and the image sticking evaluation formula. Similarly, the second image sticking test curve of the array substrate can be obtained according to the third correspondence and the fourth correspondence which are obtained through test by the preceding method and the image sticking evaluation formula.

Figure 6:
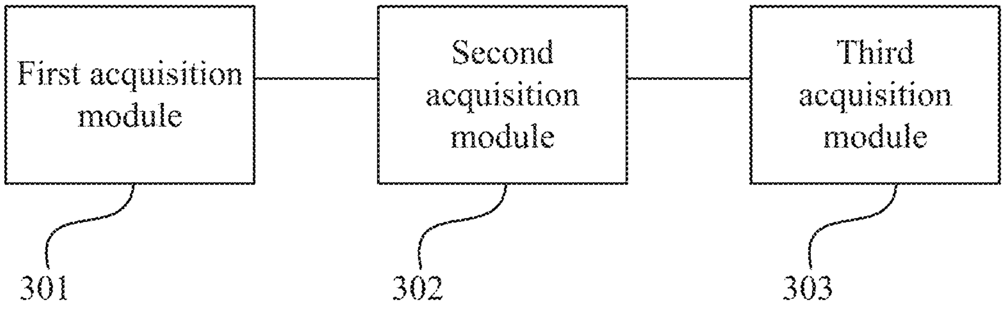
FIG. 6 is a structure diagram of an image sticking test device according to an embodiment.

FIG. 6 is a structure diagram of an image sticking test device according to an embodiment. Referring to FIG. 6, the image sticking test device includes a first acquisition module 301 and a second acquisition module 302. The first acquisition module 301 is configured to acquire a first correspondence between a source-drain current of a preset drive transistor and time within a first preset time after a voltage of the preset drive transistor in an array substrate is switched from a first preset voltage to a second preset voltage. The second acquisition module 302 is configured to acquire a second correspondence between a source-drain current of the preset drive transistor and time within a second preset time after the voltage of the preset drive transistor is switched from a third preset voltage to the second preset voltage. The first preset voltage is a voltage of the preset drive transistor when the array substrate is simulated to emit light under a condition of first grayscale, the second preset voltage is a voltage of the preset drive transistor when the array substrate is simulated to emit light under a condition of second grayscale, the third preset voltage is a voltage of the preset drive transistor when the array substrate is simulated to emit light under a condition of third grayscale, and the second grayscale is between the first grayscale and the third grayscale. The first image sticking test curve is a correspondence between time and an image sticking evaluation value.

Optionally, the image sticking evaluation formula is as follows:

$$I(t)_{JND} = \left| \frac{I(t)_A - I(t)_B}{I(t)_A + I(t)_B} - \frac{I0_A - I0_B}{I0_A + I0_B} \right|.$$

$I(t)_{JND}$ denotes an image sticking evaluation value of the array substrate at moment t after the voltage of the preset drive transistor is switched; $I(t)_A$ denotes a source-drain current of the preset drive transistor at the moment t after the voltage of the preset drive transistor is switched from the first preset voltage to the second preset voltage; $I(t)_B$ denotes a source-drain current of the preset drive transistor at the moment t after the voltage of the preset drive transistor is switched from the third preset voltage to the second preset voltage; $I0_A$ is a source-drain current of the preset drive transistor at the first preset voltage; and $I0_B$ is a source-drain current of the preset drive transistor at the third preset voltage.

The image sticking test device of this embodiment corresponds to the image sticking test method of the preceding embodiments. For the operation principle and operation mode of the image sticking test device, reference is made to the description of the image sticking test method in the preceding embodiments, and details are not repeated here. Since the image sticking test device has the same operation principle and operation mode as the image sticking test method provided in the preceding embodiments, the image sticking test device also has the same effect which is not described here in detail.

What is claimed is:

1. An image sticking test method, comprising:

acquiring a first correspondence between a source-drain current of a preset drive transistor and time within a first preset time after a voltage of the preset drive transistor in an array substrate is switched from a first preset voltage to a second preset voltage;

acquiring a second correspondence between a source-drain current of the preset drive transistor and time within a second preset time after the voltage of the preset drive transistor is switched from a third preset voltage to the second preset voltage; and acquiring a first image sticking test curve of the array substrate according to the first correspondence, the second correspondence and an image sticking evaluation formula, wherein the first image sticking test curve is a correspondence between time and an image sticking evaluation value, wherein the preset drive transistor is a drive transistor in an electrical thin-film transistor test group located in a non-active area of the array substrate.

2. The image sticking test method of claim 1, wherein the first preset voltage is a voltage of the preset drive transistor when the array substrate is simulated to emit light under a condition of first grayscale, the second preset voltage is a voltage of the preset drive transistor when the array substrate is simulated to emit light under a condition of second grayscale, the third preset voltage is a voltage of the preset drive transistor when the array substrate is simulated to emit light under a condition of third grayscale, and the second grayscale is between the first grayscale and the third grayscale.

3. The image sticking test method of claim 1, wherein the first preset voltage, the second preset voltage and the third preset voltage each comprise a gate voltage, a source voltage, and a drain voltage of the preset drive transistor.

4. The image sticking test method of claim 2, further comprising:

acquiring a third correspondence between a source-drain current of the preset drive transistor and time within a third preset time after the voltage of the preset drive transistor in the array substrate is switched from the first preset voltage to a fourth preset voltage;

acquiring a fourth correspondence between a source-drain current of the preset drive transistor and time within a fourth preset time after the voltage of the preset drive transistor is switched from the third preset voltage to the fourth preset voltage;

acquiring a second image sticking test curve of the array substrate according to the third correspondence, the fourth correspondence and the image sticking evaluation formula, wherein the second image sticking test curve is a correspondence between time and an image sticking evaluation value; and acquiring a third image sticking test curve of the array substrate according to the first image sticking test curve and the second image sticking test curve;

wherein the fourth preset voltage is a voltage of the preset drive transistor when the array substrate is simulated to emit light under a condition of fourth grayscale, the fourth grayscale is between the first grayscale and the third grayscale, and the fourth grayscale is not equal to the second grayscale.

5. The image sticking test method of claim 4, wherein the first preset voltage, the second preset voltage, the third preset voltage and the fourth preset voltage are acquired through circuit simulation.

6. The image sticking test method of claim 4, before acquiring the first correspondence, the second correspondence, the third correspondence and the fourth correspondence, further comprising at least one of:

performing a stability test on the preset drive transistor; or performing temperature aging process on the preset drive transistor.

7. The image sticking test method of claim 6, before acquiring the first correspondence, the second correspondence, the third correspondence and the fourth correspondence, further comprising:

adjusting the first preset voltage to make a source-drain current constant value of the preset drive transistor at the first preset voltage be a first current value; and adjusting the third preset voltage to make a source-drain current constant value of the preset drive transistor at the third preset voltage be a second current value.

8. The image sticking test method of claim 1, wherein the first preset time and the second preset time are greater than or equal to 60 seconds.

9. An image sticking test method, comprising:

acquiring a first correspondence between a source-drain current of a preset drive transistor and time within a first preset time after a voltage of the preset drive transistor in an array substrate is switched from a first preset voltage to a second preset voltage;

acquiring a second correspondence between a source-drain current of the preset drive transistor and time within a second preset time after the voltage of the preset drive transistor is switched from a third preset voltage to the second preset voltage; and acquiring a first image sticking test curve of the array substrate according to the first correspondence, the second correspondence and an image sticking evaluation formula, wherein the first image sticking test curve is a correspondence between time and an image sticking evaluation value, wherein the image sticking evaluation formula is $$I(t)_{JND} = \left| \frac{I(t)_A - I(t)_B}{I(t)_A + I(t)_B} - \frac{I0_A - I0_B}{I0_A + I0_B} \right|;$$

wherein I(t)JND denotes an image sticking evaluation value of the array substrate at moment t after the voltage of the preset drive transistor is switched; I(t)A denotes a source-drain current of the preset drive transistor at the moment t after the voltage of the preset drive transistor is switched from the first preset voltage to the second preset voltage; I(t)B denotes a source-drain current of the preset drive transistor at the moment t after the voltage of the preset drive transistor is switched from the third preset voltage to the second preset voltage; I0A is a source-drain current of the preset drive transistor at the first preset voltage; and I0B is a source-drain current of the preset drive transistor at the third preset voltage.

10. An image sticking test device, the image sticking device configured to:

acquire a first correspondence between a source-drain current of a preset drive transistor and time within a first preset time after a voltage of the preset drive transistor in an array substrate is switched from a first preset voltage to a second preset voltage;

acquire a second correspondence between a source-drain current of the preset drive transistor and time within a second preset time after the voltage of the preset drive transistor is switched from a third preset voltage to the second preset voltage; and acquire a first image sticking test curve of the array substrate according to the first correspondence, the second correspondence and an image sticking evaluation formula, wherein the first image sticking test curve is a correspondence between time and an image sticking evaluation value, wherein the preset drive transistor is a drive transistor in an electrical thin-film transistor test group located in a non-active area of the array substrate.

11. The image sticking test device of claim 10, wherein the image sticking evaluation formula is $$I(t)_{JND} = \left| \frac{I(t)_A - I(t)_B}{I(t)_A + I(t)_B} - \frac{I0_A - I0_B}{I0_A + I0_B} \right|;$$

wherein I(t)JND denotes an image sticking evaluation value of the array substrate at moment t after the voltage of the preset drive transistor is switched; I(t)A denotes a source-drain current of the preset drive transistor at the moment t after the voltage of the preset drive transistor is switched from the first preset voltage to the second preset voltage; I(t)B denotes a source-drain current of the preset drive transistor at the moment t after the voltage of the preset drive transistor is switched from the third preset voltage to the second preset voltage; I0A is a source-drain current of the preset drive transistor at the first preset voltage; and I0B is a source-drain current of the preset drive transistor at the third preset voltage.

12. The image sticking test device of claim 10, wherein the first preset voltage is a voltage of the preset drive transistor when the array substrate is simulated to emit light under a condition of first grayscale, the second preset voltage is a voltage of the preset drive transistor when the array substrate is simulated to emit light under a condition of second grayscale, the third preset voltage is a voltage of the preset drive transistor when the array substrate is simulated to emit light under a condition of third grayscale, and the second grayscale is between the first grayscale and the third grayscale.

13. The image sticking test device of claim 10, wherein the first preset voltage, the second preset voltage and the third preset voltage each comprise a gate voltage, a source voltage, and a drain voltage of the preset drive transistor.

14. The image sticking test device of claim 12, wherein the image sticking device is further configured to:

acquire a third correspondence between a source-drain current of the preset drive transistor and time within a third preset time after the voltage of the preset drive transistor in the array substrate is switched from the first preset voltage to a fourth preset voltage;

acquire a fourth correspondence between a source-drain current of the preset drive transistor and time within a fourth preset time after the voltage of the preset drive transistor is switched from the third preset voltage to the fourth preset voltage;

acquire a second image sticking test curve of the array substrate according to the third correspondence, the fourth correspondence and the image sticking evaluation formula, wherein the second image sticking test curve is a correspondence between time and an image sticking evaluation value; and acquire a third image sticking test curve of the array substrate according to the first image sticking test curve and the second image sticking test curve;

wherein the fourth preset voltage is a voltage of the preset drive transistor when the array substrate is simulated to emit light under a condition of fourth grayscale, the fourth grayscale is between the first grayscale and the third grayscale, and the fourth grayscale is not equal to the second grayscale.

15. The image sticking test device of claim 14, wherein the first preset voltage, the second preset voltage, the third preset voltage and the fourth preset voltage are acquired through circuit simulation.

16. The image sticking test device of claim 14, further comprising:

a processing module, which is configured to: before the first correspondence, the second correspondence, the third correspondence and the fourth correspondence are acquired, perform at least one of:

performing a stability test on the preset drive transistor; or performing T-Aging process on the preset drive transistor.

17. The image sticking test device of claim 16, further comprising:

an adjustment module, which is configured to: before the first correspondence, the second correspondence, the third correspondence and the fourth correspondence are acquired, adjust the first preset voltage to make a source-drain current constant value of the preset drive transistor at the first preset voltage be a first current value; and adjust the third preset voltage to make a source-drain current constant value of the preset drive transistor at the third preset voltage be a second current value.

18. The image sticking test device of claim 10, wherein the first preset time and the second preset time are greater than or equal to 60 seconds.

* * * * *